Feb. 11, 1969          L. MEZEY          3,426,464
COMBINED CAKE OF SOAP AND APPLICATOR
Filed June 9, 1967                    Sheet 1 of 2
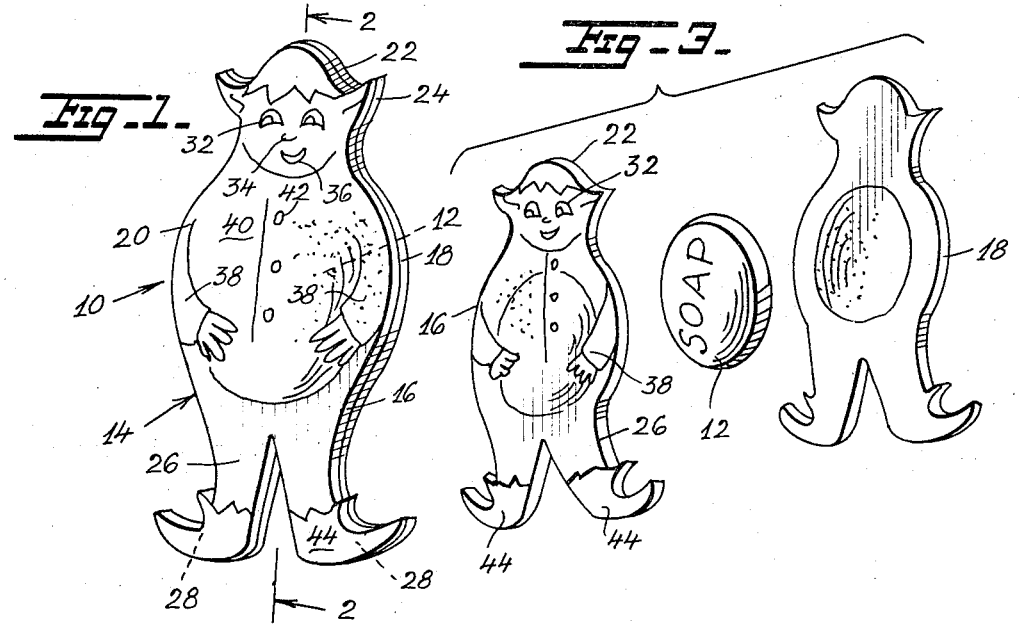
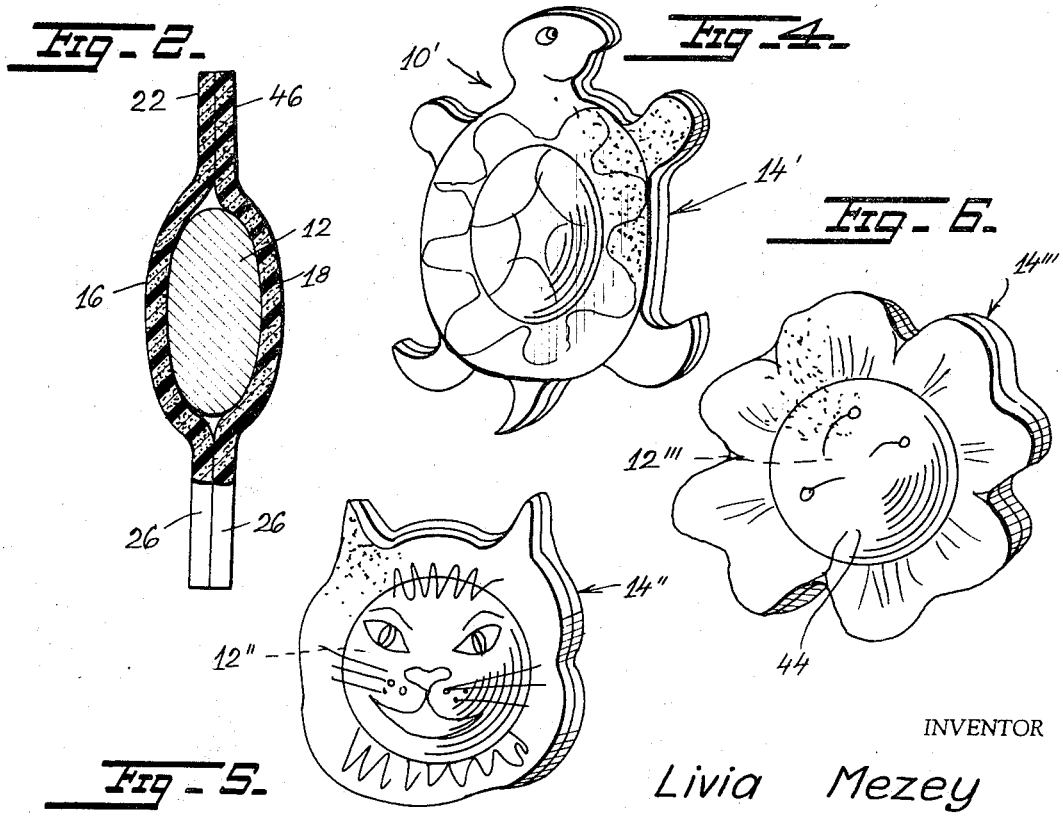
INVENTOR
Livia Mezey
BY
Polachek of Saulsbury
ATTORNEYS

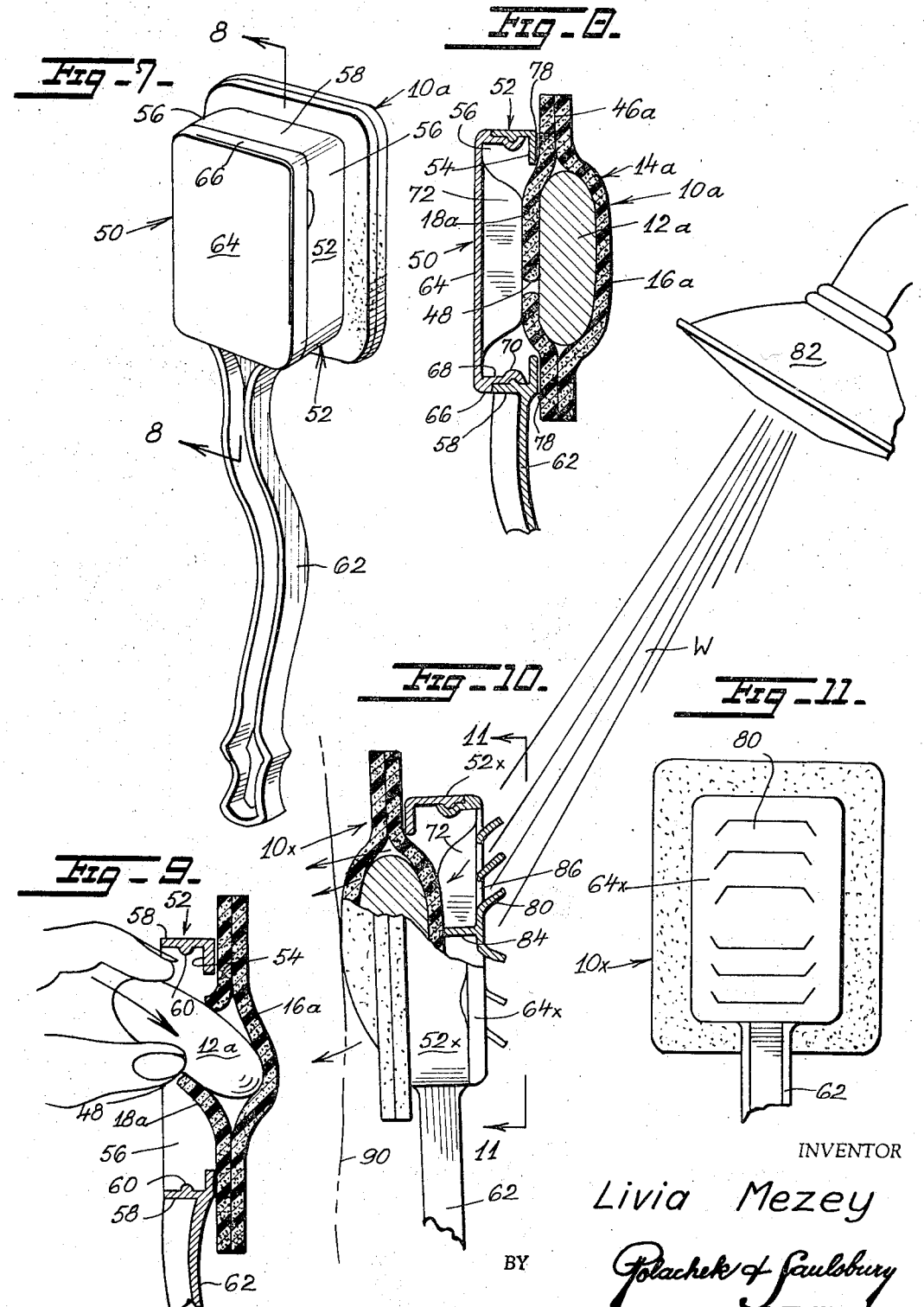

United States Patent Office 3,426,464
Patented Feb. 11, 1969

3,426,464
COMBINED CAKE OF SOAP AND APPLICATOR
Livia Mezey, 41–50 78th St., Elmhurst, N.Y. 11373
Filed June 9, 1967, Ser. No. 645,031
U.S. Cl. 401—201
Int. Cl. A47k 7/02
1 Claim

ABSTRACT OF THE DISCLOSURE

A cake of soap enclosed in a casing of sponge rubber simulating a grotesque representation of a child, animal, flower and the like. The cake of soap is positioned in the belly of the figure and the soap suds oozes out through the material of the casing, by means of which the soapy suds are applied to the portion of the body being cleaned.

---

It is well known that children are intrigued by toys, articles, stories, etc., involving some fictional personification of everyday life, such as animals, children, etc., representing some existing thing in their experience. It is equally known that children are intrigued by devices they themselves can operate and which give some positive result to their action. It is the purpose of this invention to capitalize on these human characteristics to overcome childish reluctance and to inculate good habits.

Children have difficulty in holding cakes of soap especially when wet as they slip out of their hand and are hard to grasp again and when the cake is applied by the hand only a small area of the cake of soap engages the surface of the skin being cleaned.

It is therefore a principal object of the present invention to provide a combined cake of soap and applicator whereby the soap is readily and conveniently applied to the skin being cleaned.

Another object is to provide such a combined cake of soap and applicator that is attractive to children.

Still another object of the invention is to provide a combined cake of soap and applicator that is simple in construction, efficient in operation and economical to manufacture.

Brief description of the views of the drawings

FIG. 1 is a front perspective view of a combined cake of soap and applicator embodying the invention, the applicator being in the shape of a child.

FIG. 2 is a vrtical sectional view taken on the plane of the line 2—2 of FIG. 1.

FIG. 3 is a disassembled perspective view thereof.

FIG. 4 is a view similar to FIG. 1 of a modified form of the applicator.

FIG. 5 is a similar view of another modified form of combined cake of soap and applicator.

FIG. 6 is a similar view of still another modified form of combined cake of soap and applicator.

FIG. 7 is a rear perspective view of yet another modified form of combined cake of soap and applicator.

FIG. 8 is a vertical view taken on the plane of the line 8—8 of FIG. 7.

FIG. 9 is a view similar to FIG. 8 showing a step in the assembly of the device.

FIG. 10 is a view partly in section and partly in elevation of still another modified form of combined cake of soap and applicator being shown in use.

FIG. 11 is a front view thereof, parts being broken away.

Detailed description of the drawings

Referring now in detail to the various views of the drawings, in FIG. 1 a combined cake of soap and applicator device is shown and designated generally at 10.

The device 10 comprises a cake of soap 12 enclosed in a flexible casing or applicator 14.

The casing 14 is formed of sponge rubber and is sectional, constituted by a front section 16 and a rear section 18 as viewed in FIG. 1. The sections when assembled constitute a grotesque figure of a child including body 20, head 22 with ears 24, legs 26, with feet 28, the feet projecting in opposite directions. On the outer surface of the front section 16, there are lines representing eyes 32, nose 34 and mouth 36 on the head 22. On the belly portion of the body, there are lines representing arms 38 and lines representing a jacket 40 with buttons 42. On the legs 26 are lines representing boots 44.

In assembling the device 10, the cake of soap 12 is placed in the bulged out portion of one section of the casing and the other section is then placed over the cake of soap and the adjacent surfaces of the sections heat sealed to each other as indicated at 46.

In use, the combined cake of soap and applicator 10 is moistened with water and given to the child for cleaning purposes whereupon the child will squeeze the device causing soap suds to ooze through the sponge rubber to the outside thereof. Thereupon the child will playfully apply the soapy suds by rubbing the device against the skin to be washed.

In FIG. 4, the applicator casing 14' is shaped to simulate a turtle. Otherwise the device 10' is the same as device 10.

The modified form of applicator casing 14" shown in FIG. 5 is shaped to simulate the head of a cat. The face of the cat is round and the cake of soap 12" is similarly shaped.

In FIG. 6, the modified form of applicator casing 14'" is shaped to simulate a flower, the disc-shaped pistil portion 44 is shown round and the enclosed cake of soap 12'" is similarly shaped.

In FIGS. 7 to 9, inclusive, another modification of the invention is illustrated and designated generally at 10a. The device 10a simulates a back brush and comprises a cake of soap 12a enclosed in a sectional casing 14a, rectangular in plan, the front and rear sections 16a and 18a, respectively, being heat sealed to each other where they engage as indicated at 46a. The rear section 18a is slotted horizontally as indicated at 48.

In this form of the invention, the combined cake of soap and applicator casing 10a is attached to a rectangular sectional plastic box-like adapter 50. The box-like adapter 50 comprises a rectangular shaped open frame 52 with inwardly extending peripheral flange 54 at one end thereof, with side walls 56, 56 and end walls 58, 58. A bead 60 projects inwardly of the inner surface of the end walls, centrally thereof. An elongated handle 62, channel-shaped in cross-section, is formed integrally with one end wall of the frame. A rectangular shaped flanged removable cover 64 closes the other end of the frame 52. At the ends of the cover, the flanges 66 are formed with inwardly projecting extensions 68, the free end edges of which are curved as indicated at 70 to fit over the beads 60 on the end walls of the frame. A platform 72 is formed integrally with the cover 64 on its inner surface, the platform extending inwardly to a point flush with the ends of the extensions 68 on the ends of the cover. The platform forms a supporting surface for the combined cake of soap and applicator device 10a as best seen in FIG. 8.

In assemblying the modification shown in FIGS. 7 to 9, inclusive, the applicator casing 14a is secured to the flanges 54 on the end walls of the frame 52, by means of adhesive 78. The rear section 18a thereof is then spread apart, the slot 48 permitting this operation, and the cake of soap 12a inserted between the sections 16a and 18a as shown in FIG. 9. The removable cover 64 is then placed over the frame 52.

This form of the invention is especially suitable for washing the back of the user and permits removal or replacement of the soap.

FIGS. 10 and 11 illustrate a still further modification of the invention 10x differing from the modification 10a of FIGS. 7 to 9, inclusive, merely in providing the cover 64x of the frame 52x with a series of spaced louvers 80 forming slots 86 through which water W is adapted to be passed by means of a spray head 82. The cover 64x is formed with a partition wall 84 midway its ends and the louvers 80 above the partition wall as viewed in FIG. 10 extend upwardly permitting water to be passed through the slots 86 formed by the louvers. The louvers 80 below the partition wall extend in the opposite direction or downwardly so that water may be passed therethrough from the bottom, or the cover 64x may be reversed whereby the lower louvers will receive water from the top as shown in FIG. 10. The water passes through the sponge rubber material of the casing into the body of the user.

While the invention has been described and illustrated as embodied in the drawings and description, it is not intended to be limited to the details shown, since various modifications, such as substitution of foam-rubber with other porous, soft material, or substitution of the soap with lightweight (floating) soap or soap-like material, or the soap contained in the applicator may be shaped previously resembling objects, toys, etc., may be made without departing in any way from the spirit of the present invention.

I claim:

1. A combined cake of soap and applicator as described comprising, in combination, a cake of soap and a flexible casing of water penetrable material fitted over said cake of soap, and the material of the casing being sponge rubber, the casing being shaped to simulate a back brush, the rear section of said casing being slotted, said casing including a box-like adapter secured to the rear section of the casing, said adapter including an open frame, inwardly extending flanges on one end of the frame, a cover closing the other end of the frame, an elongated integral handle extending from one end of the frame, a partition wall carried on the inner surface of the cover dividing the interior of the adapter into upper and lower compartments, the slotted rear section of the casing adapted to be separated for insertion and/or removal of the cake of soap, the rear section of the casing secured to the inwardly extending flanges, said rear section contacting said partition wall when secured in position the cover of the adapter being slotted forming louvers for receiving water therethrough, the louvers above and below the partition wall extending in opposite directions.

References Cited
UNITED STATES PATENTS

| | | | |
|---|---|---|---|
| 2,083,871 | 6/1937 | Serewicz | 401—201 |
| 2,191,642 | 2/1940 | Carvalho | 401—201 |
| 2,441,898 | 5/1948 | Novick | 401—268 |
| 3,143,755 | 8/1964 | Rowley | 401—201 |

LAWRENCE CHARLES, *Primary Examiner.*